Dec. 27, 1949   R. K. BOLAND ET AL   2,492,617
INSTANTANEOUS TACHOMETER METHOD AND APPARATUS
Filed March 19, 1945   2 Sheets-Sheet 1

INVENTORS
RALPH K. BOLAND
BOYNTON G. HAGAMAN
By Paul Paul & Moore
ATTORNEYS

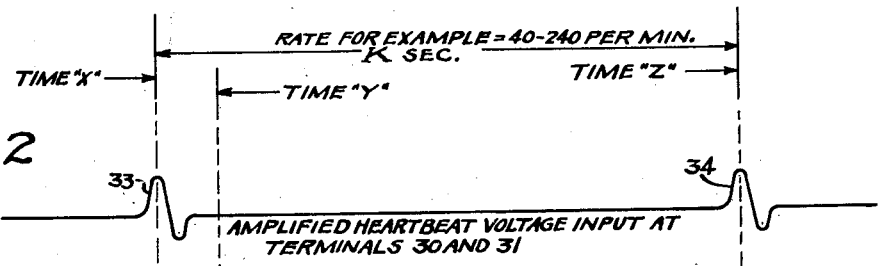

Patented Dec. 27, 1949

2,492,617

UNITED STATES PATENT OFFICE 2,492,617

INSTANTANEOUS TACHOMETER METHOD AND APPARATUS

Ralph K. Boland and Boynton G. Hagaman, Rochester, Minn., assignors to Waters Conley Company, Rochester, Minn., a corporation of Minnesota Application March 19, 1945, Serial No. 583,564

17 Claims. (Cl. 128—2.06)

1

This invention relates to a method and apparatus for establishing an operating condition in an indicator or work circuit, which is the function of the time interval elapsing between successive signal impulses that are received, and particularly to a cardiotachometer of the instantaneous reading type. Instruments heretofore available for the indication or recording of heartbeat impulses have been of several general types. In one type of electro-cardiographic apparatus the input signals generated by the heartbeat of the patient have been amplified and merely recorded on an oscillograph of the usual photographic recording type or of the cathode ray type. Where utilizing a cathode ray oscillograph there has been provided a wave form indication corresponding to that of the heartbeat impulse. By utilizing the ordinary photographic recording oscillograph, a permanent record is made of the heartbeat impulse wave form and by scaling and amplitude measurements of the photographic record, it has been possible to determine the rate, strength and other factors of importance in the heartbeat signal.

The photographic type of cardiographic instrument is disadvantageous from the standpoint of the amount of mechanism required for its use and also disadvantageous because it has been necessary first to develop and then scale the photographic record of the input signal to determine the indications. This is a cumbersome and time-consuming operation and as a consequence this method has not been readily adaptable for portable installations nor has it provided the attending physician with a readily available visible indication of the instantaneous heartbeat rate as is desirable in diagnostic work. Other heartbeat rate indicators have not provided any indication of the instantaneous rate but only an average value with the result that the attending diagnostician has not been provided with any indication of irregularities that may occur.

It is therefore an object of the present invention to provide a method and apparatus capable of furnishing instantaneous indication of the time elapsing between successive impulses received and specifically to provide a cardiographic tachometer of the instantaneous type. It is also an object of the invention to provide an apparatus capable of furnishing at its output a voltage or other electrical characteristic, the magnitude of which corresponds or bears a definite relationship to the time elapsing between successive impulses received.

Other and further objects of the invention are

2 those inherent in the apparatus herein illustrated, described and claimed.

The invention is illustrated with reference to the drawings in which

Figures 2-7 are a series of correlated graphs indicating the performance of the method and apparatus of the present invention.

Figure 1:
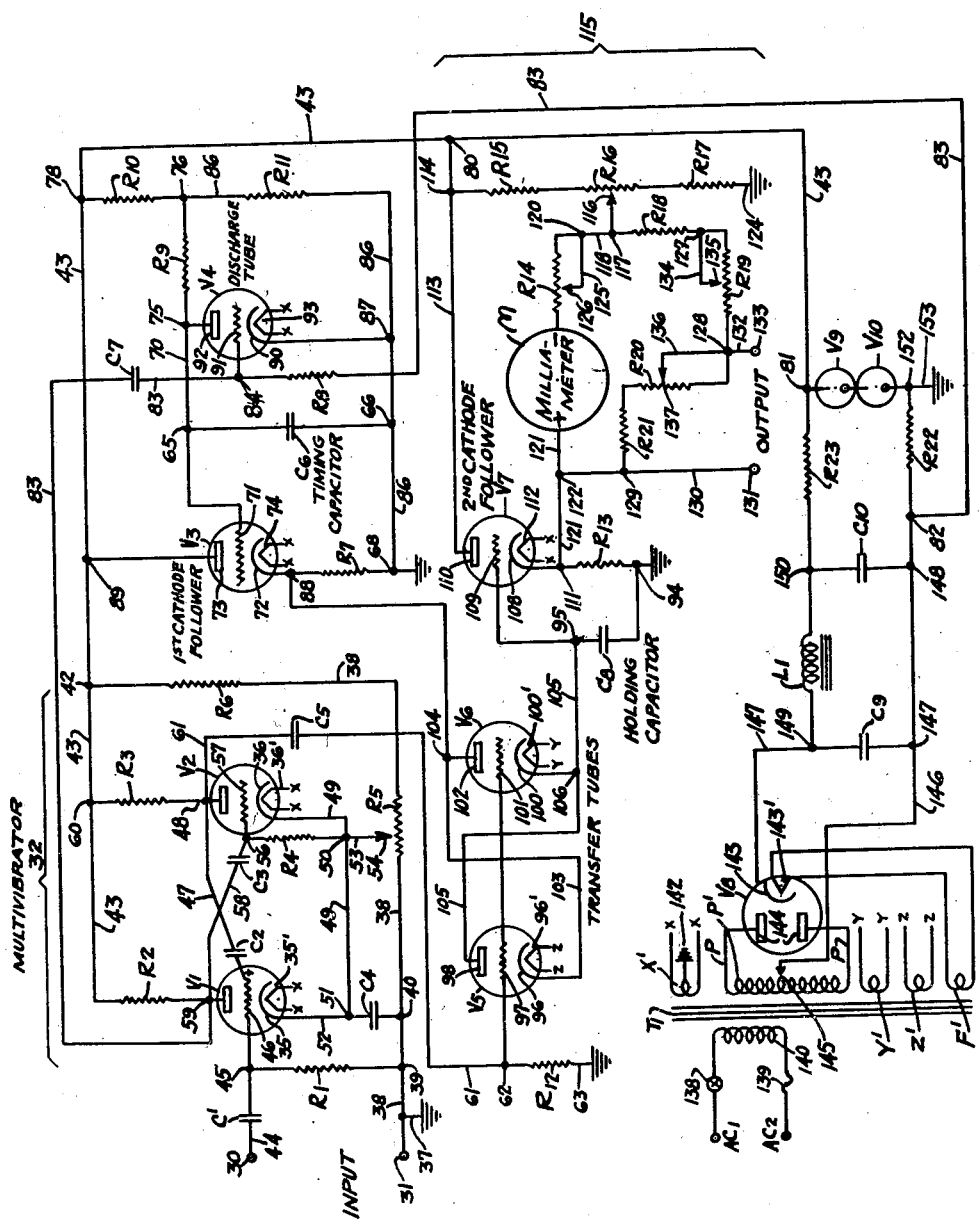
Figure 1 is a wiring diagram of the apparatus of the present invention.

Referring to Figures 1-7, the method and apparatus of the present invention have been developed for the specific purpose of instantaneously indicating the time intervals elapsing between successive heartbeats (instantaneous pulse rate) and will be explained hereinafter with reference to this specific type of apparatus, but it is obvious that there are many other applications in which the invention may be utilized. In cardiotachometer usage the frequency rate of pulse varies from about 40 to 240 beats per minute, but by appropriate selection of constants, the invention may be caused to function throughout other ranges of rates, and by utilizing other indicating or responsive apparatus the invention may, therefore, be applied to widely varying frequency rates.

Webster's New International Dictionary, 2nd edition, 1939, G. & C. Merriam Co. defines, An electrocardiograph is an instrument for recording the changes of electrical potential occurring during heartbeat, as by photographing vibrations of a string galvanometer connected to the right and left hands, or with one hand and one foot. In accordance with the present invention, for cardiotachometer usage a voltage signal is picked up by means of electrodes applied to the patient's body and the signals so provided are amplified by a resistance-coupled amplifier of conventional type which then serves as the input to the apparatus of the present invention. The input is applied at terminals 30 and 31, Figure 1.

In general the method of the present invention involves charging a timing capacitor through a suitable resistance and at a rate such that the voltage built up across the timing capacitor is indicative of the time elapsed since the last successive heartbeat. As each heartbeat occurs, this voltage across the timing capacitor is transferred to a holding capacitor where it is stored and utilized to provide a meter indication or to provide an output voltage, the value of which may be utilized for operation of any appropriate work circuit. As soon as the voltage of the timing capacitor has been transferred to the holding capacitor (when the heartbeat signal occurs), the timing capacitor is then discharged whereupon the entire cycle is repeated. Thus, the indication given or the output voltage provided during any two heartbeats (or other received signals) is proportional to or is a function of the time elapsing between the immediately preceding heartbeat or received signal.

Referring to Figure 1, under the bracket 32 there is provided a timing circuit, preferably a multivibrator capable of generating a square or abruptly rising wave of a predetermined, relatively short duration. One such timing wave is generated for each heartbeat signal received. The duration of this (preferably) square wave of the multivibrator is a constant in the apparatus and is chosen so that it is only a fraction of the time interval elapsing between heartbeats at the most rapid rate for which the system is designed. Thus, referring to Figures 2–7, the heartbeats are indicated at 33 and 34 on Figure 2. The time interval K elapsing between successive heartbeats 33 and 34 may be any time period in the range for which the instrument is designed. For example where the instrument is used as a cardiotachometer, K may range from 1/40 of a minute to 1/240 of a minute. The time interval A of the negative square wave produced by the multivibrator circuit, Figure 3, is much shorter, for example 1/2000 of a minute or even shorter, and is constant, regardless of variations in time K, between received signals (heartbeats).

The multivibrator timing network 32 consists of a pair of three-element tubes V1 and V2 which are identical. The cathode 35 of tube V1 and cathode 36 of tube V2 are indirectly heated by their filaments 35' and 36'. From input terminal 31 which is grounded at 37, line 38 extends through junctions 39 and 40 and through resistors R5 and R6 to junction 42 on line 43, which is the positive voltage supply line. Input terminal 30 is connected through line 44, condenser C1 and junction 45 to the grid 46 of tube V1, and thence through condenser C2 and line 47 to the plate terminal 48 of tube V2. Cathode 36 is connected by line 49 through junction 50 and thence to junction 51 on cathode line 52 of tube V1. Capacitor C4 is connected between junction 40 on line 38 and junction 51, and junction 50 is connected by means of line 53 to the variable tap 54 on resistance R5. From junction 50 a connection also extends through resistor R4 to junction 56 which is the terminal of grid 57 of tube V2. From the grid terminal 56, line 58 extends through capacitor C3 and thence to the plate terminal 59 of tube V1. Junction 60 on positive supply line 43 is connected through resistor R3 to the plate terminal 48 of the tube V2, and line 43 is likewise connected through resistor R2 to the plate terminal 59 of tube V1. Junction 45 on the grid of tube V1 is connected through resistor R1 to junction 39 on the grounded line 38, and the plate terminal 48 of tube V2 is connected through line 61 and capacitor C5 to junction 62 and thence through resistor R12 to ground 63.

The multivibrator circuit is theoretically capable of being stabilized at any of a variety of steady state conditions but in actual practice, due to slight electrical disturbances, the circuit is capable of vibration. In the system of this invention, the constants of the multivibrator circuit are chosen so that the multivibrator system stabilizes in the steady state with tube V1 non-conductive and tube V2 conductive. When a positive input signal is applied to grid 46, tube V1 becomes conductive which in turn causes the voltage at its plate terminal 59 to become less positive. This drop in voltage is applied through the condenser C3 to grid 57 of tube V2 (which in the steady state is conductive), and causes tube V2 to become less conductive, and this in turn causes the voltage of the plate terminal 48 of tube V2 to become more positive. Application of this more positive voltage through condenser C2 to the grid 46 of tube V1 makes the grid 46 still more positive and hence tube V1 becomes even more conductive. But this cumulative action cannot continue indefinitely for one or both of two reasons. The current in tube V1 cannot increase indefinitely because there is a definite cut-off determined by the maximum available cathode emission from cathode 35. Likewise, tube V2 cannot decrease below a predetermined value because of the emissivity characteristics of the tube. Therefore, the voltage at terminal 48 cannot continue to increase beyond a predetermined amount and likewise the voltage at plate 59 does not decrease below a predetermined value. The transfer of voltage from plate terminal 48 to grid 46 and from plate terminal 59 to grid 57 occurs only when the voltages at the plates are changing. Hence, when the plate terminal voltages cease to change, the grids 46 and 57 tend to resume their static potentials due to resistors R1 and R4, respectively. When this happens the plate currents tend to become normal again, thus starting the same train of circumstances in the opposite direction Hence, the multivibrator circuit tends to oscillate, and circuits of this type are capable of producing sustained oscillations.

The reason the multivator stops after one reversal is because of the dissymmetry in bias that is introduced in the grid circuits. The potential drop across that part of resistor R5 between junctions 39 and 54 biases the grid 46 of tube V1 negatively with respect to cathode 35 so that even though the negative voltage applied through condenser C2 is diminishing, tube V1 remains non-conductive until again started into an oscillation by a positive pulse on the input circuit. Then it goes through the complete oscillation as described, and again stops after one oscillation. For this reason the circuit may be designated as a "flip-flop" circuit.

The multivibrator output is illustrated in Figures 3 and 4. Figure 3 represents the voltage at the plate terminal 59 of tube V1, and Figure 4 represents the voltage at the plate terminal 48 of the tube V2. These output voltages are square, or nearly square, in wave form and the leading edge corresponds in time to the input pulse (time X in Figures 2–7) and the trailing edge comes at a definite time interval later (time Y in Figures 2–7). The definite time interval (constant A) is determined by the values of the multivibrator circuit and once established this becomes a constant in the apparatus. Both the negative square wave at the plate of tube V1 and the positive square wave at the plate of tube V2 are utilized for timing purposes in the invention as hereinafter more fully explained.

Referring again to Figure 1, there is illustrated a timing capacitor C6 which is connected to junctions 65 and 66, the latter being grounded through line 86 to ground terminal 68. The timing capacitor C6 is charged through line 70 which extends from the grid 71 of tube V3 through junction 65 and junction 75 and thence through resistor R9 to junction 76 which is connected through resistor R10 to junction 78 on positive supply line 43. Line 43 extends through junction 80 and thence to the positive output terminal 81 of a direct current voltage supply, hereinafter more fully described. The negative output terminal 82 of the voltage supply is connected through line 83 which extends through resistor R8 to the grid terminal 84 of a discharge tube V4 and thence through condenser C7 to the plate terminal 59 of the multivibrator tube V1. Terminal 76 (below resistor R10) is likewise connected by line 86 through resistor R11 and thence through cathode terminal 87 and junction 66 to ground terminal 68. By utilizing low energy instruments or work circuits, the stored charge on C6 may be used directly or transferred directly as hereinafter described, but it is preferable to utilize the stored charge merely to control the output of a power source of larger capacity. For this purpose a thermionic tube, here designated a "cathode follower," is used.

Thermionic tube V3 is a high input-impedance three-element tube and is provided with a cathode 72, grid 71 and anode 73. This tube is called the "first cathode follower," for another second cathode follower is also used as hereinafter described. Cathode 72 is indirectly heated by the filament 74. Grid 71 of tube V3 is connected to terminal 65 of the timing capacitor C6. The cathode 72 is connected through output junction 88 and thence through resistor R7 to ground terminal 68, the anode 73 being connected to junction 89 on positive supply line 43. As the voltage of the positive terminal 65 of the timing capacitor varies due to the charge accumulated upon the timing capacitor C6, the conductivity of tube V3 likewise varies and the current passed by the tube changes the voltage drop across resistor R7 with the result that at output junction 88 there is provided a voltage which is a direct and correlated function representative of the voltage accumulated on the timing capacitor C6.

The tube V4 forms a discharge path for the timing capacitor C6 and is of the conventional three-element type having a cathode 90, grid 91, anode 92 and a cathode heater 93. The cathode is connected to the cathode terminal 87 on the ground line 86, the anode 92 being connected to junction 75 on the charging line 70 connected to the positive terminal of the timing capacitor C6. The conductivity of the discharge tube V4 depends upon the voltage impressed upon it through condenser C7 in line 83. The voltage of the grid of tube V4 is shown in Figure 6. The grid is normally maintained at a voltage level such that the tube is non-conductive and it simply remains non-conductive through the negative swing at time interval D. However, at time E the grid becomes positive instantaneously due to the positive swing of the plate terminal 59 of multivibrator tube V1 which is impressed upon grid 91 of tube V4 through line 83 and capacitor C7. Consequently the discharge tube V4 instantaneously becomes conductive and serves as a discharge path for the timing capacitor C6. This path is from the capacitor C6, line 70, to junction 75, through the then conductive discharge tube V4 to the terminal 87 on line 86, and thence to terminal 66 which is the opposite terminal of the timing capacitor C6. Tube V4 soon returns to the non-conductive state due to the dissipation of its positive grid-charge through resistor R8 to negative line 83.

The charging of timing capacitor C6 is by means of the positive output line 43, thence through junction 78, resistor R10, junction 76 and resistor R9 to the positive terminal of the timing capacitor C6. The values of resistor R9 and timing capacitor C6 are regulated so that the timing capacitor never quite reaches full charge during the longest interval for which the instrument is designed, and consequently the voltage across the timing capacitor serves as a measure of the elapsed time interval from the last received signal.

As previously explained the voltage of the timing capacitor C6 (which controls and is reflected by the voltage of the cathode follower tube V3 at output junction 88 of the latter) serves to determine the voltage of a holding capacitor illustrated in Figure 1 at C8. The holding capacitor C8 is connected from ground terminal 94 to junction 95. The transfer of the potential of terminal 88 of the cathode follower tube V3 to the holding capacitor C8 is accomplished by means of a pair of transfer tubes V5 and V6. These are identical three-element tubes, the tube V5 consisting of a cathode 96, grid 97 and anode 98. The transfer tube V6 likewise has a cathode 100, grid 101 and anode 102. Line 103 is connected to the cathode (output) terminal 88 of the first cathode follower tube V3, and extends to the plate terminal 104 of tube V6 and thence to the cathode 96 of the transfer tube V5. Terminal 95 of the holding capacitor C8 is connected through line 105 to the cathode terminal 106 of transfer tube V6 and thence to the anode 98 of the transfer tube V5. The grid 101 of the tube V6 is connected to the grid 97 of tube V5 and thence to junction 62. Junction 62 is connected through line 61 and capacitor C5 to the plate terminal of the multivibrator tube V2.

Multivibrator tube V2 is normally conductive and it becomes non-conductive as illustrated by the positive square wave in Figure 4. When the plate of multivibrator tube V2 thus becomes positive, this voltage (of plate terminal 48) is impressed through capacitor C5 upon junction 62 and the grids 97 and 101 of transfer tubes V5 and V6, which hence become positive instantaneously at time X as shown in Figure 5. This positive pulse on the grids 97 and 101 soon dissipates to ground 63 via resistor R12, the time of dissipation being illustrated by interval B of Figure 5. The transfer tubes V5 and V6 are hence conductive for a short instant and this is equivalent to the establishment of a connection between junction 88 on the first cathode follower tube V3 and the terminal 95 of the holding capacitor C8.

The flow of current between these junctions depends upon whether the holding capacitor has been charged at a higher voltage than existing at junction 88 or whether the reverse is true. The current flow is through either the tube V5 or the tube V6 since these tubes are inverted with respect to each other and both become conductive at the same instant. When the voltage at junction 88 is higher than that at terminal 95 of the holding capacitor C8, current flows through line 103 to the anode 102 of tube V6 and thence to the cathode 100, through line 105 to the terminal 95. When the voltage at terminal 95 of the holding capacitor C8 is higher than at junction 88 of the first cathode follower, the current flow is from terminal 95 through line 105 to anode 98 to the cathode 96 of the transfer tube V5 and thence through plate terminal 104 of line 103 to terminal 88 of the first cathode follower tube V3. This action serves in any event to equalize the voltage between the holding capacitor C8 and terminal 88, and tubes V5 and V6 then return to the non-conductive condition. Immediately thereafter (time Y, Figures 2-7), the timing capacitor C6 is discharged as previously described, but when this occurs the grids 97 and 101 of the transfer tubes V5 and V6 (Figure 5) are negative and the transfer tubes are non-conductive. The negative swing during interval C (Figure 5) has no effect. Hence the voltage transferred to the holding capacitor C8 is maintained for its useful purpose and the timing capacitor C6 again begins to charge.

The voltage across the holding capacitor C8 may be utilized directly but is preferably utilized for the control of a second cathode follower tube V7 of the same type as tube V3. Tube V7 has an indirectly heated cathode 108, a grid 109 and an anode 110. The cathode is heated indirectly by the filament 112. The positive junction 95 of the holding capacitor C8 is connected to the grid 109 and thereby controls the current passed through the second cathode follower tube V7 which flows by a circuit extending from ground 94 through resistance R13, junction 111 through 108 and thence through the tube V7 to the anode 110 and thence by line 113 through junction 114 to junction 80 on the positive feed line 43.

The output voltage is the voltage existing between junctions 111 and 114 (or from 111 to ground, if desired) and this is utilized through a network of resistors shown generally opposite the bracket 115. One circuit through the resistor network extends from junction 114 on line 113, through resistor R15 and through the upper part of resistor R16 to tap 116, thence to junction 117 and through line 118 to junction 120, and thence through more or less of resistor R14 and through the milliammeter M, through line 121, junction 122 and thence to junction 111. The circuit also extends from variable tap 116 through the lower part of resistor R16, through resistor R17 to ground 124. By adjusting the variable tap 116 on resistor R16, it is possible to balance the voltage at this point so that it equals the voltage at junction 111 and thereby allowing adjustment of the meter M to the zero point of the scale. This adjustment is made when the output between points 111 and 114 is at the highest frequency rate (pulse rate) that the instrument is designed to handle. Thus, where the scale of meter M is calibrated to read from 240 pulse beats per minute to 40 beats per minute, the instrument is calibrated against any suitable standard producing 240 beats per minute, and with the output so established the variable tap 116 is adjusted until the meter M reads zero.

A portion of resistor R14 is bridged by the variable short circuiting line extending from junction 120 through line 125 to the variable tap 126. This adjustment allows the meter M to be brought to full scale at the minimum frequency rate for which the system is designed. Thus, where the instrument is designed to register a minimum pulse rate of 40 pulse beats per minute, a frequency of this magnitude from a suitable standard is impressed upon the input terminals and the adjustable tap 126 is varied, shorting out more or less of resistor R14 until the meter reading is brought to the maximum point on the scale. The meter M is then calibrated at intermediate frequencies so as to establish various points on the meter scale.

Where it is desired to utilize the voltage output for the operation of a galvanometer or for the operation of any suitable work circuit the output is taken off the resistor network extending from junction 117, through resistor R18, to junction 127 and thence through more or less of the variable resistor R19 to junction 128 and thence through more or less of the variable resistor R20 and through the resistor R21 to junction 129. The output circuit is established through line 130, to output terminal 131 and through line 132 extending to output terminal 133. Resistors R20 and R21 provide the proper electrical damping for the particular instrument (galvanometer) that may be coupled to the output leads 131 and 133. Resistors R20 and R21 also effect the sensitivity of the external instrument by acting as a current shunt. In order to provide proper adjustment of damping and final sensitivity of the instrument (galvanometer) resistances R18 and R19 are included, for by decreasing or increasing the total value of R18 plus R19, the current through the exterior instrument can be raised or lowered.

A conventional power supply for the instrument is provided from alternating current lines AC1 and AC2 which are connected through a snap switch 138 and fuse 139 to the primary winding 140 of a transformer T1 having a plurality of secondary windings X', Y', Z', F' and P'. The winding X' has its midpoint grounded at 142 and its terminals X—X serve to supply filament current to the filaments 35' and 36' of the multivibrator tubes V1 and V2, to the filaments 74 and 112 of the first and second cathode follower tubes V3 and V7 and to the filament 93 of the discharge tube V4. The winding Y' having output terminals Y—Y serves to supply current to the cathode heater filament 100' of the transfer tube V6, while the winding Z' having output terminals Z—Z serves to supply filament current to the filament 96' of the transfer tube V5. The winding F' serves to supply current to the filament 143' of the rectifier tube V8. The filament 143' indirectly heats the cathode 143 of the rectifier tube, the anodes 144 being connected to the terminals P—P of the plate voltage secondary winding P' of the transformer T1. The mid tap 145 of the winding P' is connected to line 146 extending through junctions 147 and 148 to the output terminal 82 of the power pack. The cathode 143 is connected through line 147 to junction 149 and through the inductance L1 to junction 150 and thence through resistance R23 to the positive output terminal 81 of the power pack. A condenser C9 is connected across junctions 147 and 149 and a condenser C10 across junctions 148 and 150. A pair of voltage regulator tubes V9 and V10 of critical voltage gas-discharge type are connected in series and are grounded at junction 152 by means of ground 153 and the circuit is extended from junction 152, through resistor R22 to the negative output terminal 82.

Operation

It is assumed for purposes of illustration that the pulse rate as determined by the time interval between the prior two successive pulses is 1/240 of a minute and that the timing capacitor C6 has been charged through resistors R9 and R10 to a value indicative of this time interval. Since the grid 71 of the first cathode follower tube V3 is connected to the positive terminal 65 of the timing capacitor C6, the current flowing through the tube V3 is therefore a function of the grid voltage and at junction 88 there occurs a voltage with respect to ground that is likewise a function of the timing capacitor voltage. As the next successive pulse occurs, the multivibrator generates the negative square wave at the voltage of the plate of tube V1 illustrated in Figure 3 and the positive square wave at the plate of tube V2 as indicated by Figure 4. The positive square wave has the effect of impressing a positive voltage on the grids 97 and 101 of the transfer tubes V5 and V6 as illustrated by Figure 5, portion B, and the transfer tubes accordingly become conductive. This serves in effect to connect the terminal 95 of the holding capacitor C8 to terminal 88 of the first cathode follower tube V3 and the holding capacitor either charges or discharges as the case may be, depending upon whether its voltage is less or more than the voltage at junction 88.

It will be noted that the grids of V5 and V6 are returned to chassis through R12 but that both cathodes are connected to points positive with respect to chassis, V5 cathode to junction 88 and V6 cathode to junction 95. This results in a negative grid to cathode voltage on V5 equal to the voltage across R7 and a negative grid to cathode voltage on V6 equal to the voltage across C8. Thus, both V5 and V6 are normally non-conductive.

It may be noted that when the voltage across R7 is a minimum due to the discharge of condenser C6, the grids of tubes V5 and V6 are made further negative by the portion of the differentiated multivibrator pulse, Figure 5, interval C.

As the grids 97 and 101 again assume their normal value, as illustrated in Figure 5, the transfer tubes V5 and V6 become non-conductive, the negative voltage impressed upon these grids at time C, Figure 5, being ineffective inasmuch as the tubes at that time are already non-conductive. The charge thus transfers to the holding capacitor C8, establishing a predetermined voltage across it, and this voltage in turn establishes a definite current flow through the second cathode follower tube V7. Since the instrument is assumed already to have been calibrated, this current flow through the second cathode follower tube establishes a potential on the junction 111 which is equal to that established at 116 and the meter is not deflected, i. e. it remains at the 240 per minute scale mark (i. e. the zero current position of the meter).

The negative square wave occurring at the plate of multivibrator tube V1 illustrated in Figure 3 has no effect as it swings to the negative since it serves merely to produce a more negative voltage on the grid 91 of the discharge tube V4. This is illustrated in Figure 6, time interval D. However, as the multivibrator tube completes its vibration and the negative voltage at the plate of tube V1 again decreases to a steady state value, time Y, a positive voltage is impressed upon the grid 91 of the discharge tube V4 as illustrated during time interval E, Figure 6, and this normally non-conductive tube becomes conductive and thus serves as a discharge path for the timing capacitor C6 through the circuit previously described. After the short time interval E, Figure 6, the discharge tube V4 again becomes non-conductive and the timing capacitor C6 again begins to charge through resistor R9 and R10 through the circuit previously described. The charge continues through the time interval elapsing until the next pulse is received and, for purposes of illustration, it is assumed that a longer period of time elapses equivalent to say 40 heartbeats per minute. When the next heartbeat signal is impressed upon the input terminals 30—31, the cycle is repeated and the voltage at terminal 88 on the first cathode follower V3 again is transferred to the holding capacitor C8. In this instance, however, the voltage is greater since a longer time interval for charging had elapsed and the holding capacitor C8 hence charged to the higher voltage. This has the effect of increasing the current flow through the second cathode follower tube V7 and hence the voltage at point 111 immediately becomes more positive, with the result that a potential is impressed upon the meter M. Since it is assumed that the meter has already been calibrated at the 40 beats per minute rate, the meter then would indicate 40 on the scale.

Thus, a diagnostician utilizing the instrument may observe that the needle of the instrument M moves quickly from one scale reading to the other, either up or down, or may remain steady. The possibility that the meter may move to another scale reading occurs once for each input signal received; whether or not it does move to a new position depends upon whether the signal impulse rate has changed. The meter M is preferably of the aperiodic type and is preferably sufficiently sensitive so that it quickly assumes a new reading where this occurs. Where the needle moves up or down, this indicates that there is a variation in the instantaneous rate of pulse, the amount of variation being indicated by the position of the meter needle on the scale.

By utilizing a cathode ray oscillograph connected to the output terminals 131—133, there may be indicated, with reasonable accuracy, impulse rates in much higher frequency than may be indicated by a mechanical instrument such as the meter M. A meter such as that illustrated at M and heretofore described is well adapted for the relatively slow pulse rates encountered in cardiographic diagnosis. By suitable variation in constants the instrument and method of the present invention may be utilized for indicating or operating work circuits in accordance with instantaneous acceleration of mechanical and electrical apparatus, and for other rate functions, at frequency ranges much above or below those here specifically illustrated.

As many apparently widely different embodiments of this invention may be made without departing from the spirit and scope thereof, it is to be understood that we do not limit ourselves to the specific embodiments herein except as defined by the appended claims.

What we claim is:

1. An apparatus for establishing a voltage characteristic, the magnitude of which is a function of the time interval elapsing between successive impulses received, which comprises a storage condenser, a holding condenser, a thermionic voltage follower responsive to the voltages across the storage condenser, means for gradually charging said storage condenser during the time intervals between successive signal impulses received, means for generating a timing impulse in response to the reception of each signal impulse, means responsive to the timing impulse so generated for charging said holding condenser to a voltage which is a function of the voltage produced on the voltage follower of the storage condenser and for then discharging said storage condenser, and a voltage follower responsive to the voltage so established on the holding condenser.

2. The apparatus of claim 1 further characterized in that the means for generating a timing impulse comprises multivibrator thermionic tube network.

3. In a cardiotachometer system including means for deriving the heartbeat signal of a patient, the improvements comprising a storage condenser, a holding condenser, means for gradually charging said storage condenser during the time interval between successive heartbeat signals, a thermionic voltage follower network connected to the storage condenser for continuously establishing a voltage which is a function of the voltage across the storage condenser, means for generating a timing impulse in response to each heartbeat signal received, means responsive to said timing impulse for charging the holding condenser from said thermionic voltage follower and for then discharging said storage condenser, and means responsive to the voltage across the holding condenser for showing the duration of time between successive heartbeat signals.

4. The apparatus in claim 3 further characterized in that the means responsive to the voltage across the holding condenser is an electrical measuring instrument.

5. In a cardiotachometer system having means for deriving the heartbeat signal of a patient, the improvements comprising a storage condenser, a holding condenser, means for gradually charging said storage condenser during the time interval between successive heartbeat signals, a first thermionic voltage follower network connected to the storage condenser for continuously establishing a voltage which is a function of the voltage across the storage condenser, means for generating a timing impulse in response to each heartbeat signal received, means responsive to said timing impulse for charging a holding condenser from said thermionic voltage follower and for then discharging said storage condenser, a second voltage follower network connected to the holding condenser for continuously establishing a voltage which is a function of the voltage across the holding condenser, and means responsive to the voltage established by the second voltage follower.

6. The apparatus of claim 5 further characterized in that the means responsive to the voltage established across the second voltage follower is an electrical current measuring instrument.

7. The apparatus of claim 5 further characterized in that the means for generating a timing impulse comprises a multivibrator network capable of generating a single square wave for each input signal received.

8. The apparatus of claim 5 further characterized in that the means responsive to the voltage established by the second voltage follower includes a resistor network.

9. The apparatus of claim 5 further characterized in that the means responsive to the voltage established by the second voltage follower, includes an electrical measuring instrument and a potentiometer network for adjusting the instrument to zero deflection for a predetermined rate of impulses received and resistor means for adjusting the maximum deflection thereof for a predetermined other rate of impulses received.

10. The method of establishing an operating condition which is a function of the time elapsing between successive signal impulses which comprises from a power source independent of received signals applying an electrical charge at a constant gradual rate to a first condenser for a time period which is a function of the time period elapsed between successive received signal impulses, and as each signal is received first transferring the charge existing on the first condenser to establish a charge on a second condenser and then immediately discharging the first condenser, and establishing an indication responsive to the voltage across the second condenser until another impulse is received.

11. The method of establishing a voltage characteristic, the magnitude of which is a function of the time interval elapsing between successive signal impulses received, which comprises from a power source independent of received signals applying a charge at a constant rate to a condenser during the time interval between successive signal impulses, generating a timing impulse in response to the reception of each signal impulse, said timing impulse being only a fraction as long as the shortest time interval between received signals utilizing the beginning of each timing impulse to transfer the charge accumulated on the condenser to a responsive circuit, establishing a voltage characteristic in said responsive circuit which is a function of the voltage accumulated on said condenser and utilizing the termination of each impulse to discharge the condenser preparatory to the next cycle of operation.

12. The method of establishing a voltage characteristic, the magnitude of which is a function of the time interval elapsing between successive signal impulses received, which comprises from a source separate from said signal and at a constant rate charging a storage condenser during the time interval between successive signal impulses received, generating a timing impulse in response to the reception of each signal impulse, said impulse being only a fraction as long as the shortest time interval between received signals, utilizing the beginning of each such timing impulse to establish a voltage on a holding condenser, said voltage being proportional to the voltage established by the accumulated charge on the storage condenser, utilizing the termination of each timing impulse for discharging the storage condenser, and establishing a voltage characteristic responsive to the charge on the holding condenser.

13. An apparatus for establishing an operating condition which is a function of the time interval elapsing between successive signal impulses comprising a capacitor storage element, means independent of said signals including a power source and resistance connected to said capacitor for applying an electrical charge to said capacitor storage element at a constant rate such that the instantaneous value of the voltage across said capacitor storage element at any time is a function of the time period elapsed since the previous signal impulse, and a responsive circuit including a holding capacitor and means for instantaneously connecting it to the capacitor storage element for establishing a voltage on said holding capacitor which is a function of the voltage across said capacitor storage element and for then instantaneously discharging said capacitor storage element as the next successive impulse is received.

14. An apparatus for establishing an electrical operating condition which is a function of the time elapsing between successive signal impulses, first and second condensers, means independent of said signal source including a power source and resistance connected to the first condenser for applying an electrical charge at a constant rate to a first condenser during the period elapsing between successive impulses, means including a generator of timing impulses having a duration of only a fraction of the time elapsing between the most rapidly received signal impulses and including thermionic tube circuits responsive to said generator of timing impulses and connecting the first and second condensers for establishing a voltage on the second condenser which is proportional of the charge on the first condenser and immediately thereafter discharging the first condenser as each impulse is received, and means responsive to the charge on the second condenser.

15. The apparatus of claim 14 further characterized in that the means responsive to the voltage of said second condenser is an indicating instrument.

16. An apparatus for establishing a voltage characteristic, the magnitude of which is a function of the time interval elapsing between successive signal impulses received from a signal source which comprises a condenser, means including a power source independent of said signals and connected through a resistance to said condenser for charging said condenser at a constant rate in the time between successive signal impulses, impulse generator means connected to said signal source for generating a timing impulse in response to each signal impulse received, said timing impulse having a duration which is only a fraction as long as the shortest time elapsing between received signal impulses, thermionic tube means connected to said impulse generator means and to said condenser and responsive to the beginning of each timing impulse for establishing a voltage in a work circuit responsive to the voltage accumulated on said condenser and responsive to the termination of each impulse to discharge the condenser preparatory to the next cycle of operation.

17. An apparatus for establishing a voltage characteristic, the magnitude of which is a function of the time interval elapsing between successive impulses received from a signal source, which comprises a storage condenser, a holding condenser, means including a power source independent of said signal source and connected through a resistor to said condenser for charging said storage condenser at a constant rate during the time intervals elapsing between successive signal impulses received, impulse generator means connected to said signal source for generating a timing impulse in response to the reception of each signal impulse, thermionic voltage supply and circuit control means connected to said impulse generator means and to said storage and holding condensers and responsive to each timing impulse of the impulse generator means for first charging the holding condenser to a voltage which is a function of the voltage across the storage condenser and for then discharging the storage condenser, and means responsive to the voltage of the holding condenser.

RALPH K. BOLAND.
BOYNTON G. HAGAMAN.

REFERENCES CITED

The following references are of record in the file of this patent:

UNITED STATES PATENTS

| Number | Name | Date |
|---|---|---|
| 2,021,766 | Bivens | Nov. 19, 1935 |
| 2,121,117 | Conover | June 21, 1938 |
| 2,186,727 | Martin et al. | Jan. 9, 1940 |
| 2,271,478 | Eldredge | Jan. 27, 1942 |
| 2,294,015 | Salb et al. | Aug. 25, 1942 |
| 2,301,195 | Bradford | Nov. 10, 1942 |
| 2,335,265 | Dodington | Nov. 30, 1943 |
| 2,359,447 | Seeley | Oct. 3, 1944 |
| 2,372,017 | Rogers | Mar. 10, 1945 |
| 2,377,757 | Clark | June 5, 1945 |
| 2,377,969 | Richter | June 12, 1945 |
| 2,403,557 | Sanders | July 9, 1946 |
| 2,411,573 | Holst et al. | Nov. 26, 1946 |
| 2,415,567 | Schoenfeld | Feb. 11, 1947 |